United States Patent
Dubay et al.

(10) Patent No.: US 9,994,247 B2
(45) Date of Patent: Jun. 12, 2018

(54) STEERING COLUMN ASSEMBLY

(71) Applicant: Steering Solutions IP Holding Corporation, Saginaw, MI (US)

(72) Inventors: Robert W. Dubay, Saginaw, MI (US); Zach P. Schultz, Munger, MI (US); Donald A. Buzzard, Saginaw, MI (US); Michael P. Anspaugh, Bay City, MI (US); Randy W. Jones, North Branch, MI (US); Roger A. Bourbina, Saginaw, MI (US); Matthew T. Vincent, Saginaw, MI (US)

(73) Assignee: STEERING SOLUTIONS IP HOLDING CORPORATION, Saginaw, MI (US)

( * ) Notice: Subject to any disclaimer, the term of this patent is extended or adjusted under 35 U.S.C. 154(b) by 88 days.

(21) Appl. No.: 15/148,403

(22) Filed: May 6, 2016

(65) Prior Publication Data
US 2017/0320513 A1   Nov. 9, 2017

(51) Int. Cl.
*B62D 1/19* (2006.01)
*B62D 1/184* (2006.01)

(52) U.S. Cl.
CPC ............. *B62D 1/195* (2013.01); *B62D 1/184* (2013.01)

(58) Field of Classification Search
CPC ................................ B62D 1/184; B62D 1/195
See application file for complete search history.

(56) References Cited

U.S. PATENT DOCUMENTS

| | | | | |
|---|---|---|---|---|
| 7,914,043 B2* | 3/2011 | Olgren | .................... | B62D 1/184 280/775 |
| 8,827,311 B2* | 9/2014 | Schnitzer | ............... | B62D 1/184 188/371 |
| 2008/0191457 A1* | 8/2008 | Ridgway | ................ | B62D 1/184 280/775 |
| 2010/0300237 A1* | 12/2010 | Ridgway | ................ | B62D 1/184 74/493 |
| 2010/0300238 A1* | 12/2010 | Ridgway | ................ | B62D 1/184 74/493 |
| 2011/0185839 A1* | 8/2011 | Inoue | ..................... | B62D 1/184 74/493 |
| 2013/0298717 A1* | 11/2013 | Burns | ..................... | B62D 1/184 74/493 |
| 2016/0075367 A1* | 3/2016 | Sakuda | .................. | B62D 1/185 74/493 |
| 2016/0167691 A1* | 6/2016 | Imagaki | ................. | B62D 1/185 280/775 |

* cited by examiner

*Primary Examiner* — James A English
(74) *Attorney, Agent, or Firm* — Cantor Colburn LLP (57) ABSTRACT

A steering column assembly includes an energy absorption assembly. The energy absorption assembly includes an energy absorption strap, a bracket, a pin, and a cam member. The energy absorption strap includes a plurality of engagement members. The bracket is disposed on at least one of a lower jacket assembly and an upper jacket assembly. The bracket has a first wall disposed opposite a second wall. The pin extends through the first wall and the second wall to couple the cam member to the bracket. The cam member has a plurality of complementary engagement members configured to engage the plurality of engagement members.

20 Claims, 5 Drawing Sheets

STEERING COLUMN ASSEMBLY

BACKGROUND OF THE INVENTION

Some vehicles are provided with a telescopically adjustable steering column assembly. Vehicle packaging and functional design constraints may present challenges to efficiently design a telescoping lock feature to secure an energy absorption strap provided to absorb energy during a steering column collapse event. Existing designs to secure an energy absorption strap are not easily adapted to accommodate both high and low load energy absorption strap variants within a steering column design.

SUMMARY OF THE INVENTION

According to an embodiment of the present disclosure, a steering column assembly is provided. The steering column assembly includes a lower jacket assembly, an upper jacket assembly, and an energy absorption assembly. The lower jacket assembly defines an opening that extends along a steering column axis. The upper jacket assembly is at least partially received within the opening of the lower jacket assembly. The energy absorption assembly includes an energy absorption strap, a bracket, a pin, and a cam member. The energy absorption strap is coupled to the lower jacket assembly and the upper jacket assembly. The energy absorption strap includes a plurality of engagement members. The bracket is disposed on at least one of the upper jacket assembly and the lower jacket assembly. The bracket has a first wall disposed opposite a second wall. The pin extends through the first wall and the second wall. The cam member is disposed about the pin. The cam member has a plurality of complementary engagement members configured to engage the plurality of engagement members.

According to another embodiment of the present disclosure, a steering column assembly is provided. The steering column assembly includes an energy absorption strap, a bracket, and a cam member. The energy absorption strap has a first portion, a second portion, and an intermediate portion. The first portion is coupled to a lower jacket assembly. The second portion is coupled to an upper jacket assembly that is slidably received within the lower jacket assembly. The intermediate portion extends between the first portion and the second portion and has a plurality of engagement members. The bracket is disposed on one of the lower jacket assembly or the upper jacket assembly. The bracket has a first wall that defines a first opening and a second wall that defines a second opening. The cam member is disposed between the first wall and the second wall. The cam member is pivotally connected to the bracket by a pin that extends through the first opening and the second opening. The cam member has a first cam member portion and a second cam member portion. The second cam member portion has a plurality of complementary engagement members configured to engage the plurality of engagement members.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

The present disclosure relates to a steering column assembly having an energy absorption assembly.

Referring now to the Figures, where the invention will be described with reference to specific embodiments, without limiting same, it is to be understood that the disclosed embodiments are merely illustrative of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Throughout this specification, the term "attach," "attachment," "connected," "coupled," "coupling," "mount," or "mounting" shall be interpreted to mean that a structural component or element is in some manner connected to or contacts another element, either directly or indirectly through at least one intervening structural element, or is integrally formed with the other structural element.

Figure 1:
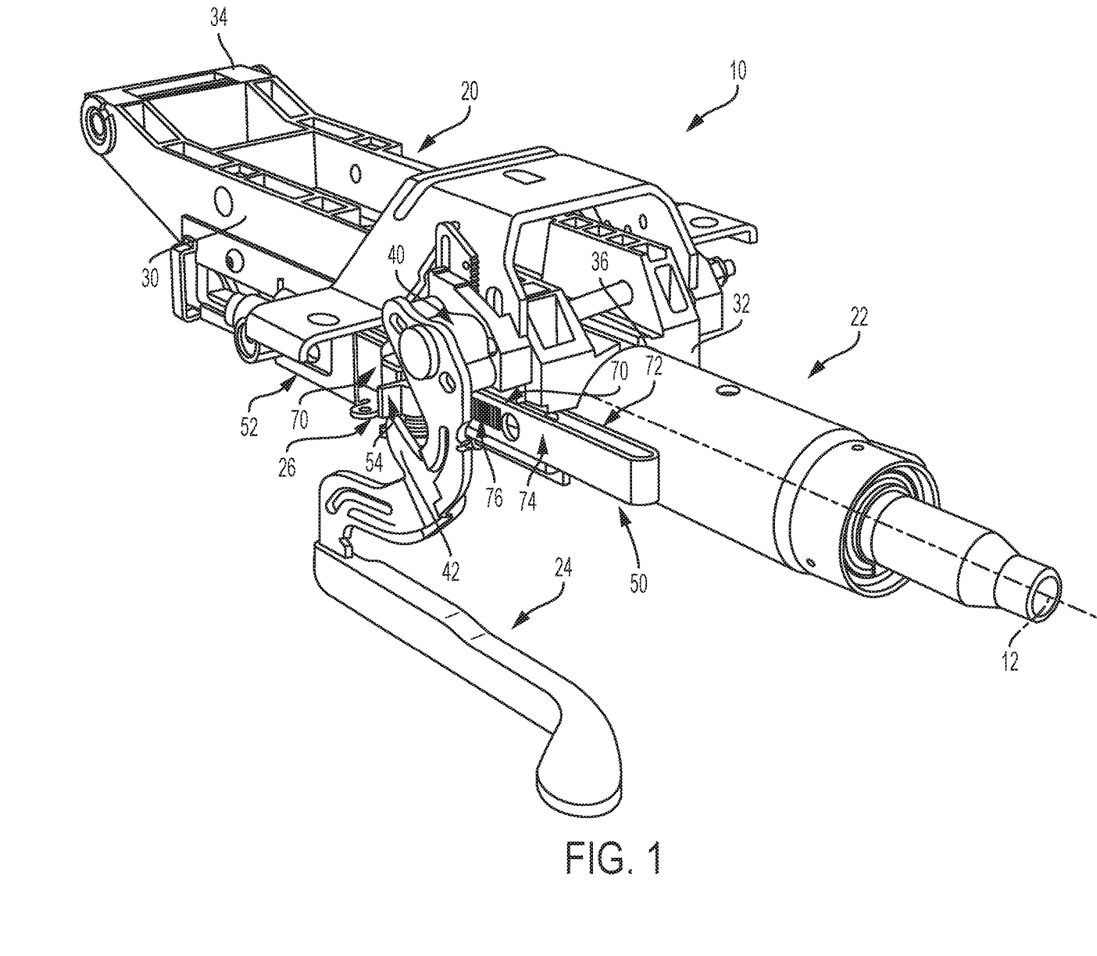
FIG. 1 is a perspective view of a steering column assembly.
Figure 2:
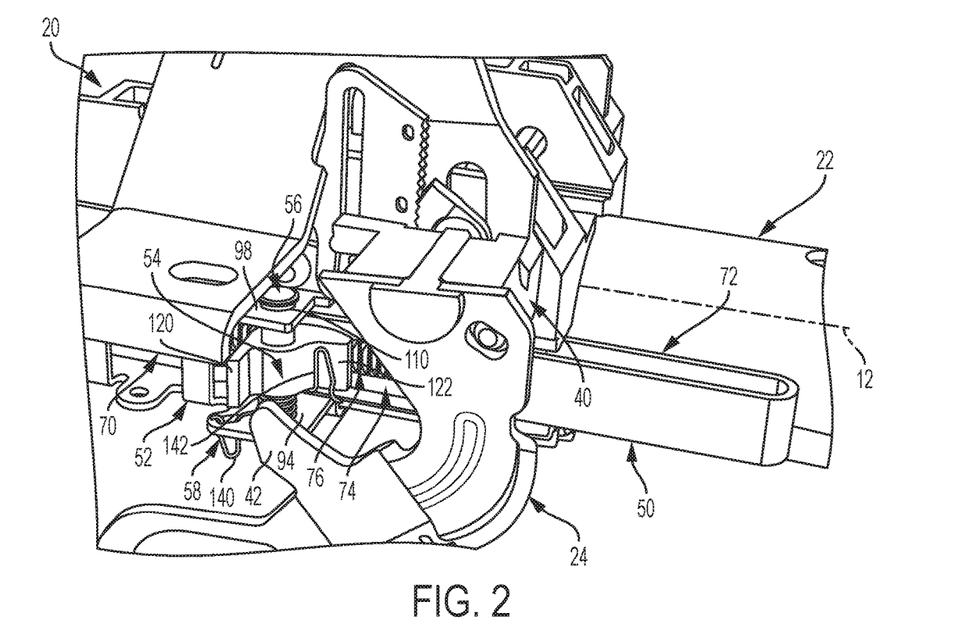
FIG. 2 is a partial perspective view of an adjustment lever of the steering column assembly in a lock position.
Figure 3:
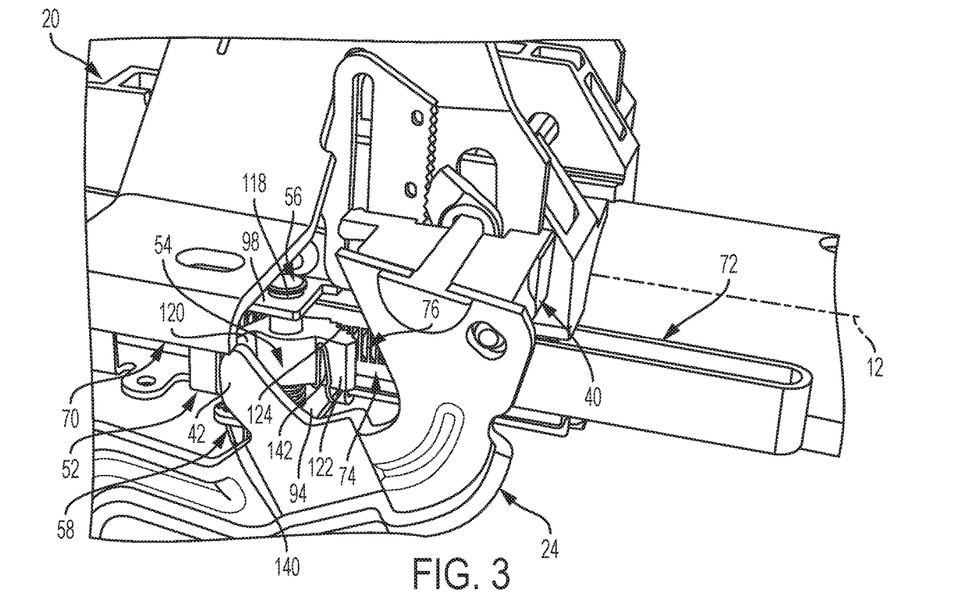
FIG. 3 is a partial perspective view of the adjustment lever of the steering column assembly moving towards the unlock position.

Referring to FIGS. 1-3, a steering column assembly 10 is shown. The steering column assembly 10 is provided with a vehicle. The steering column assembly 10 extends along a steering column axis 12. The steering column assembly 10 is an adjustable telescopic steering column assembly wherein at least a portion of the steering column assembly 10 translates along the steering column axis 12. The steering column assembly 10 includes a lower jacket assembly 20, an upper jacket assembly 22, an adjustment lever 24, and an energy absorption assembly 26.

The lower jacket assembly 20 is connected to a vehicle. The lower jacket assembly 20 includes a lower jacket body 30 that extends between a first end 32 and a second end 34 of the lower jacket assembly 20. The lower jacket assembly 20 is connected to the vehicle structure proximate the first end 32 by a mounting bracket. The lower jacket assembly 20 is connected to the vehicle structure at the second end 34.

The lower jacket body 30 of the lower jacket assembly 20 defines an opening 36. The opening 36 extends from the first end 32 of the lower jacket assembly 20 towards the second end 34 of the lower jacket assembly 20.

Figure 4:
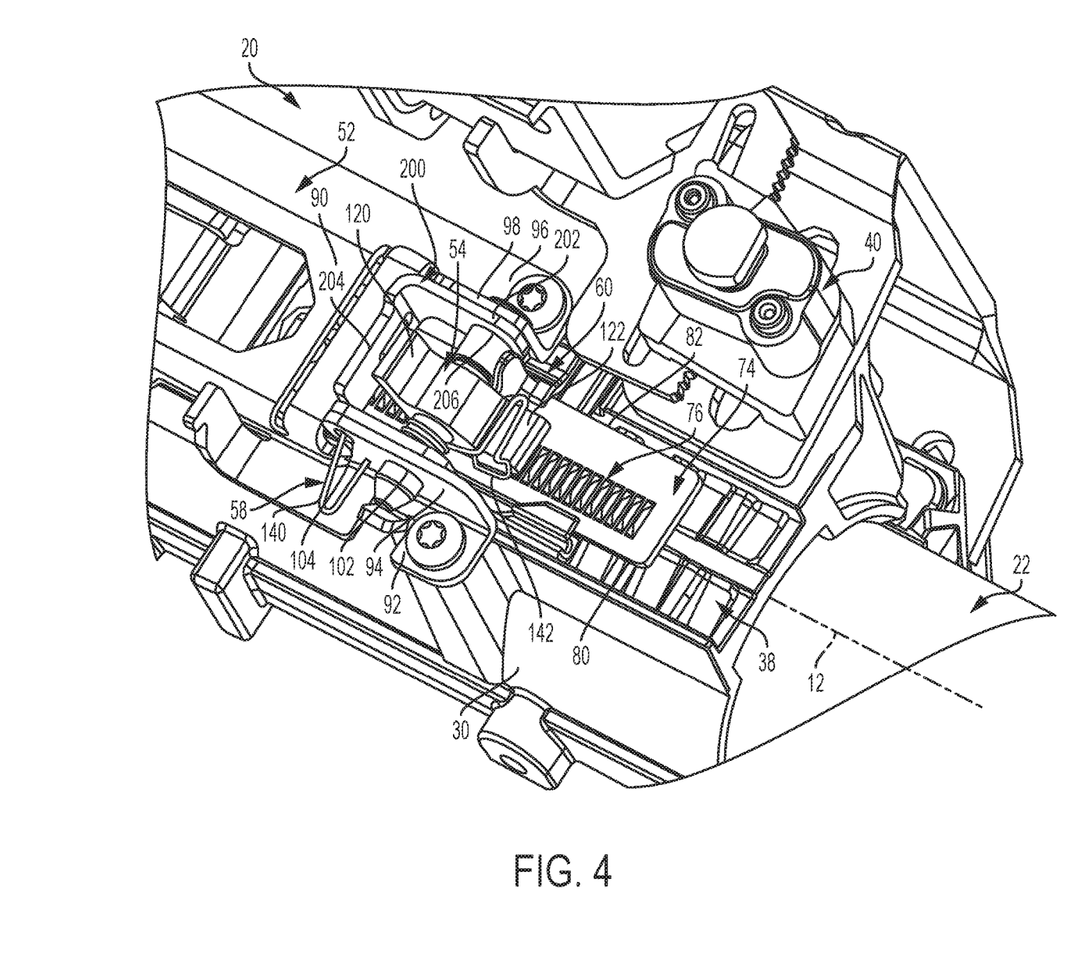
FIG. 4 is a partial perspective view of an energy absorption assembly of the steering column assembly.

Referring to FIG. 4, the lower jacket body 30 of the lower jacket assembly 20 defines a recessed region 38. The recessed region 38 extends from an exterior surface of the lower jacket body 30 towards the steering column axis 12.

Referring to FIGS. 1-4, the upper jacket assembly 22 is at least partially received within the opening 36 of the lower jacket assembly 20. The upper jacket assembly 22 is translatable along the steering column axis 12 to telescopically adjust a position of a steering wheel coupled to the upper jacket assembly 22.

The adjustment lever 24 is coupled to the lower jacket assembly 20 through a locking mechanism 40. The adjustment lever 24 is movable between a lock position and an unlock position by an operator of the vehicle. The adjustment lever 24 pivotally moves between the lock position and the unlock position about an axis that extends through the locking mechanism 40. The axis is disposed transverse to the steering column axis 12. The operator of the vehicle is able to move the adjustment lever 24 from the lock position towards the unlock position to adjust a position of the steering wheel connected to the upper jacket assembly 22.

The lock position of the adjustment lever 24 corresponds to a position in which the locking mechanism 40 inhibits movement or telescopic adjustment of the upper jacket assembly 22 relative to the lower jacket assembly 20 along the steering column axis 12. The lock position maintains the steering wheel connected to the upper jacket assembly 22 in a position stable for driving. The unlock position of the adjustment lever 24 corresponds to a position in which the locking mechanism 40 permits movement or telescopic adjustment of the upper jacket assembly 22 relative to the lower jacket assembly 20 along the steering column axis 12.

The adjustment lever 24 includes a protrusion such as a lobe 42. The lobe 42 extends from the adjustment lever 24. The lobe 42 extends towards the second end 34 of the lower jacket assembly 20. The lobe 42 is disposed substantially parallel to the steering column axis 12. In at least one embodiment, the lobe 42 is disposed on a surface of the adjustment lever 24 that faces towards the lower jacket assembly 20. The lobe 42 is disposed substantially perpendicular to the steering column axis 12 and extends towards the lower jacket assembly 20.

The energy absorption assembly 26 interfaces with the lower jacket assembly 20 and with the upper jacket assembly 22. The energy absorption assembly 26 includes an energy absorption strap 50, a bracket 52, a cam member 54, a pivot pin 56, a biasing member 58, and the support guide 60.

Referring to FIGS. 1-4, the energy absorption strap 50 extends between the lower jacket assembly 20 and the upper jacket assembly 22. The energy absorption strap 50 is at least partially received within the recessed region 38 of the lower jacket body 30. The energy absorption strap 50 is configured to provide a drag load or force opposing stroking or translation of the upper jacket assembly 22 relative to the lower jacket assembly 20 along the steering column axis 12 to decelerate the steering column assembly 10 during a steering column collapse event. The drag load or force opposing stroking or translation of the upper jacket assembly 22 relative to the lower jacket assembly 20 may be variable based on the configuration of the energy absorption strap 50.

The energy absorption strap 50 includes a first portion 70, a second portion 72, and an intermediate portion 74. The first portion 70 and the second portion 72 of the energy absorption strap 50 are coupled to the upper jacket assembly 22. The intermediate portion 74 extends between the first portion 70 and the second portion 72 and becomes coupled to the lower jacket assembly 20 at the engagement members 76.

The intermediate portion 74 is provided with a plurality of engagement members 76. The plurality of engagement members 76 are disposed between a first side 80 and a second side 82 disposed opposite the first side 80 of the intermediate portion 74. The plurality of engagement members 76 are configured as ridges, teeth, protrusions, or the like.

The bracket 52 is disposed on the lower jacket body 30 of the lower jacket assembly 20. In at least one embodiment, the bracket 52 is disposed on upper jacket assembly 22. The bracket 52 includes a mounting portion 90 that extends across the recessed region 38 of the lower jacket body 30. The mounting portion 90 includes a first mounting arm 92, a first wall 94, a second mounting arm 96, and a second wall 98. The first mounting arm 92 is disposed proximate the first side 80 of the intermediate portion 74 of the energy absorption strap 50. The first mounting arm 92 receives a fastener to couple the first mounting arm 92 to the lower jacket body 30 of the lower jacket assembly 20.

The first wall 94 extends from the first mounting arm 92. The first wall 94 is disposed substantially perpendicular to the first mounting arm 92. The first wall 94 defines a first opening 102 and a biasing member opening 104. The first opening 102 extends completely through the first wall 94. The biasing member opening 104 extends completely through the first wall 94. The biasing member opening 104 is disposed proximate the first opening 102. In at least one embodiment, the biasing member opening 104 is offset from the first opening 102.

The second mounting arm 96 is disposed opposite the first mounting arm 92. The second mounting arm 96 and the first mounting arm 92 are disposed on opposite sides of the recessed region 38 of the lower jacket body 30. The second mounting arm 96 is disposed proximate the second side 82 of the intermediate portion 74 of the energy absorption strap 50. The second mounting arm 96 receives a fastener to couple the second mounting arm 96 to the lower jacket body 30 of the lower jacket assembly 20.

The second wall 98 extends from the second mounting arm 96. The second wall 98 is disposed substantially perpendicular to the second mounting arm 96. The second wall 98 defines a second opening 110. The second opening 110 extends completely through the second wall 98. The second opening 110 is proximately aligned with the first opening 102.

The cam member 54 is configured as a lock cam that secures the energy absorption strap 50 to the lower jacket assembly 20 when the adjustment lever is in or is oriented to the locked position. The cam member 54 is disposed between the first wall 94 and the second wall 98 of the bracket 52. The cam member 54 is spaced apart from and does not engage either of the first wall 94 and the second wall 98. The cam member 54 is pivotally connected to the first wall 94 and the second wall 98 of the bracket 52 by the pivot pin 56. The cam member 54 is configured to pivot about the pivot pin 56.

The cam member 54 includes a first cam member portion 120 and a second cam member portion 122. The first cam member portion 120 is configured as a tab or a wing that extends away from the second cam member portion 122.

The second cam member portion 122 extends away from the first cam member portion 120. The second cam member portion 122 includes a plurality of complementary engagement members 124. The plurality of complementary engagement members 124 are configured as ridges, teeth, protrusions, or the like.

The plurality of complementary engagement members 124 are configured to selectively engage the plurality of engagement members 76 of the intermediate portion 74 of the energy absorption strap 50. The plurality of complementary engagement members 124 are configured to selectively engage the plurality of engagement members 76 of the intermediate portion 74 of the energy absorption strap 50 based on the position of the adjustment lever 24. While the adjustment lever 24 is in the lock position, the plurality of complementary engagement members 124 engage the plurality of engagement members 76. The engagement between the plurality of complementary engagement members 124 and the plurality of engagement members 76 inhibit translation of the energy absorption strap 50. While the adjustment lever 24 is moving towards or is in the unlock position, the cam member 54 is pivoted or rotated about the pivot pin 56 such that the plurality of complementary engagement members 124 are spaced apart from the plurality of engagement members 76. The spacing of the plurality of complementary engagement members 124 apart from the plurality of engagement members 76 permits translation of the energy absorption strap 50 during a telescope adjustment of the steering column assembly 10.

Referring to FIGS. 2-6, the pivot pin 56 extends through the first opening 102 and the second opening 110 of the bracket 52 and extends through the cam member 54. The pivot pin 56 includes a pivot pin body 130 that extends between a pivot pin tip 132 and a pivot pin head 134. The pivot pin body 130 extends through the first opening 102 of the first wall 94 and the second opening 110 of the second wall 98 of the bracket 52. The pivot pin body 130 has a pivot pin body diameter. The pivot pin head 134 has a pivot pin head diameter that is greater than the pivot pin body diameter.

Figure 5:
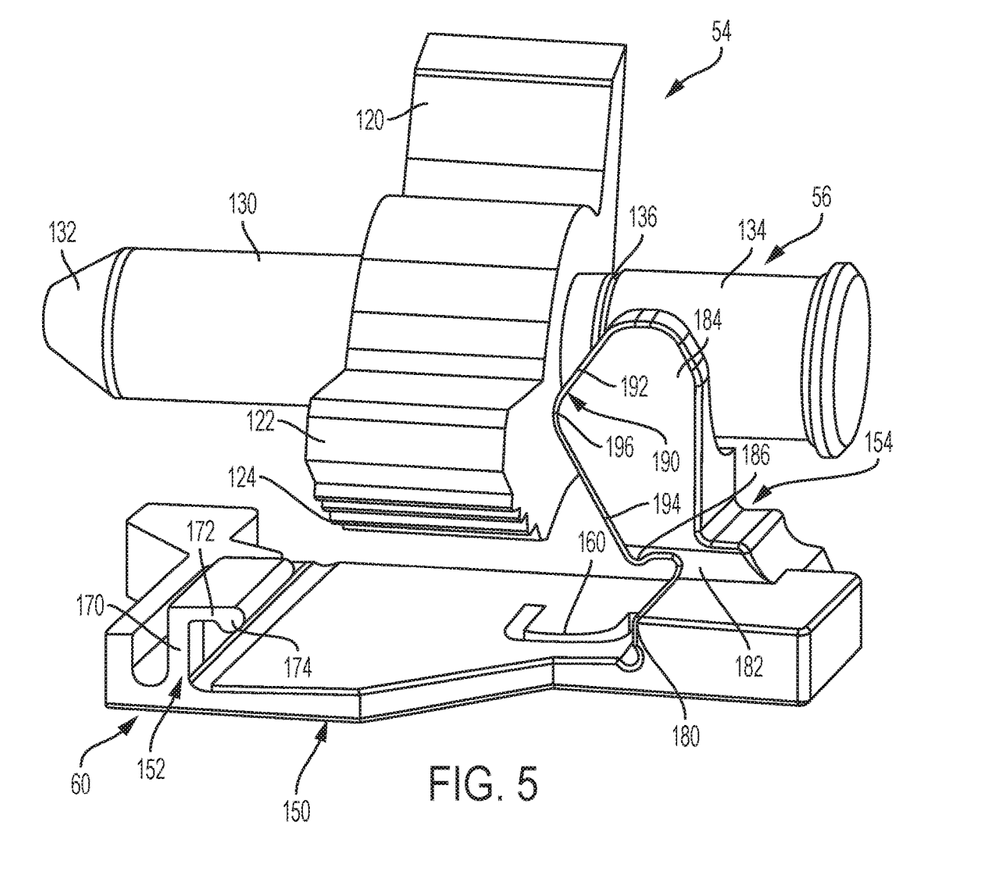
FIG. 5 is a perspective view of a pin, a cam member, and a support guide of the energy absorption assembly of the steering column assembly.

The pivot pin 56 includes a shoulder region 136 that extends between the pivot pin body 130 and the pivot pin head 134. The shoulder region 136 provides a transition between the pivot pin body 130 and the pivot pin head 134. The shoulder region 136 is disposed between the pivot pin tip 132 and the pivot pin head 134. The shoulder region 136 is disposed between a side of the cam member 54 and the second wall 98 of the bracket 52 when the pivot pin 56 pivotally connects the cam member 54 to the bracket 52. The shoulder region 136 laterally positions the cam member 54 during rotation of the cam member 54.

The biasing member 58 is disposed about the pivot pin 56. The biasing member 58 is at least partially disposed between a side of the cam member 54 and the first wall 94 of the bracket 52. In at least one embodiment, the biasing member 58 and the shoulder region 136 are disposed on opposite sides of the cam member 54 when the pivot pin 56 pivotally connects the cam member 54 to the bracket 52.

The biasing member 58 includes a first biasing member portion 140 and the second biasing member portion 142. The first biasing member portion 140 extends at least partially through the biasing member opening 104 of the first wall 94 of the bracket 52. The first biasing member portion 140 engages an inner surface of the biasing member opening 104.

The second biasing member portion 142 engages the second cam member portion 122. The second biasing member portion 142 engages a surface of the second cam member portion 122 disposed opposite the plurality of complementary engagement members 124. The second biasing member portion 142 of the biasing member 58 biases the plurality of complementary engagement members 124 of the cam member 54 towards engagement with the plurality of engagement members 76 of the energy absorption strap 50.

Figure 6:
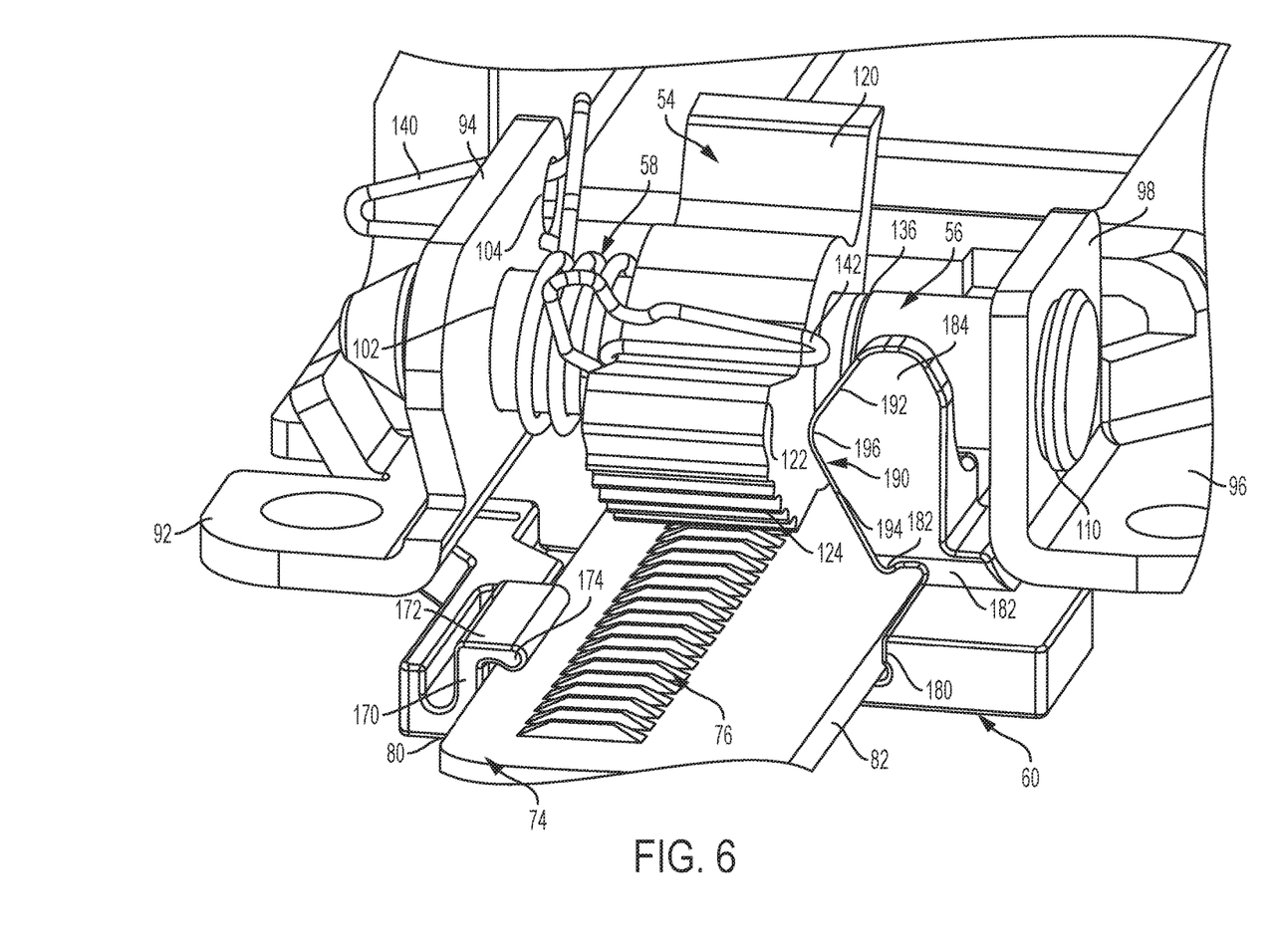
FIG. 6 is a perspective view of the energy absorption assembly of the steering column assembly.

Referring to FIGS. 4-6, the support guide 60 is disposed on the lower jacket assembly 20. The support guide 60 is at least partially received within the recessed region 38 of the lower jacket body 30 of the lower jacket assembly 20. The support guide 60 includes a base 150, a first guide member 152, and a second guide member 154.

A surface of the energy absorption strap 50 is disposed proximate a surface of the base 150. In at least one embodiment, a surface of the energy absorption strap 50 engages a surface of the base 150. The base 150 includes a preload tab 160. The preload tab 160 engages a surface of the energy absorption strap 50. The preload tab 160 provides a zero clearance fit or a de-lashed fit between the energy absorption strap and a surface of the base 150 of the support guide 60.

The first guide member 152 extends from the base 150. The first guide member 152 is disposed proximate the first side 80 of the energy absorption strap 50. The first guide member 152 includes a first extension portion 170 and a first lip portion 172.

The first extension portion 170 is disposed substantially perpendicular to the base 150. The first extension portion 170 is disposed substantially parallel to the first side 80 of the energy absorption strap 50. The first extension portion 170 is configured to engage the first side 80 of the energy absorption strap 50 to at least partially laterally position the energy absorption strap 50.

The first lip portion 172 extends from an end of the first extension portion 170. The first lip portion 172 is disposed substantially perpendicular to the first extension portion 170. The first lip portion 172 is disposed substantially parallel to the base 150. The first lip portion 172 at least partially extends over the first side 80 of the energy absorption strap 50. In at least one embodiment, the first lip portion 172 includes a rounded tip or a protrusion 174 configured to engage a surface of the energy absorption strap 50 to inhibit the lifting off of the energy absorption strap 50 away from the base 150.

The second guide member 154 extends from the base 150. The second guide member 154 is disposed opposite and is spaced apart from the first guide member 152. The second guide member 154 is disposed proximate the second side 82 of the energy absorption strap 50. The second guide member 154 includes a second extension portion 180, a second lip portion 182, and a position control element 184.

The second extension portion 180 is disposed substantially perpendicular to the base 150. The second extension portion 180 is disposed substantially parallel to the first extension portion 170. The second extension portion 180 is disposed substantially parallel to the second side 82 of the energy absorption strap 50. The second extension portion 180 is configured to engage the second side 82 of the energy absorption strap 50 to at least partially laterally position the energy absorption strap 50.

The second lip portion 182 extends from an end of the second extension portion 180. The second lip portion 182 is disposed substantially perpendicular to the second extension portion 180. The second lip portion 182 is disposed substantially parallel to the base 150. The second lip portion 182 at least partially extends over the second side 82 of the energy absorption strap 50. In at least one embodiment, the second lip portion 182 includes a rounded tip or a protrusion 186 configured to engage a surface of the energy absorption strap 50 to inhibit the lifting off of the energy absorption strap 50 away from the base 150.

The position control element 184 extends from the second lip portion 182. The position control element 184 is disposed proximate the second cam member portion 122 of the cam member 54.

The position control element 184 includes an engagement side 190. The engagement side 190 is configured to engage a side of the cam member 54. The engagement side 190 includes a first segment 192, a second segment 194, and an intersection segment 196. The first segment 192 and the second segment 194 extend away from the intersection segment 196 in opposite directions at an angle with respect to each other. The angle may be an obtuse angle and may be configured such that the first segment 192 and the second segment 194 extend generally towards the second wall 98 of the bracket 52.

The first segment 192 is configured as a lead-in feature for assembly of the cam member 54 to direct the second cam member portion 122 having the plurality of complementary engagement members 124 towards the plurality of engagement members 76 of the energy absorption strap 50. The first segment 192 is configured to aid in repositioning the cam member 54 as the cam member 54 rotates back from disengagement between the plurality of complementary engagement members 124 and the plurality of engagement members 76 towards engagement of the plurality of complementary engagement members 124 with the plurality of engagement members 76, in response to the adjustment lever 24 moving from the unlock position towards the lock position.

Referring to FIG. 4, in at least one embodiment, a reinforcement plate 200 is provided. The reinforcement plate 200 is configured to inhibit an over travel condition of the cam member 54 during rotation or pivoting of the cam member 54 in response to the rotation of the adjustment lever 24 from the lock position towards the unlock position. The reinforcement plate 200 is disposed between the first wall 94 and the second wall 98 of the bracket 52.

The reinforcement plate 200 includes a first reinforcement plate portion 202 and a second reinforcement plate portion 204. The first reinforcement plate portion 202 is disposed proximate and substantially parallel to the second wall 98 of the bracket 52. The first reinforcement plate portion 202 is configured to engage the second wall 98 of the bracket 52. The first reinforcement plate portion 202 defines a first reinforcement plate portion opening 206. The first reinforcement plate portion opening 206 is proximately aligned with the second opening 110. The pivot pin 56 extends through the second opening 110 and the first reinforcement plate portion opening 206 to couple the reinforcement plate 200 to the second wall 98 of the bracket 52.

The second reinforcement plate portion 204 extends from the first reinforcement plate portion 202 towards the first wall 94 of the bracket 52. The second reinforcement plate portion 204 is disposed substantially perpendicular to the first reinforcement plate portion 202. The first cam member portion 120 is configured to engage the second reinforcement plate portion 204 in response to the lobe 42 of the adjustment lever 24 engaging the first cam member portion 120 to rotate the cam member 54 during rotation of the adjustment lever from the lock position towards the unlock position.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A steering column assembly, comprising:
    a lower jacket assembly defining an opening extending along a steering column axis;
    an upper jacket assembly at least partially received within the opening;
    an energy absorption assembly, including:
        an energy absorption strap coupled to the lower jacket assembly and the upper jacket assembly, the energy absorption strap including a plurality of engagement members,
        a bracket disposed on at least one of the upper jacket assembly and the lower jacket assembly, the bracket having a first wall disposed opposite a second wall,
        a pin extending through the first wall and the second wall, and
        a cam member disposed about the pin, the cam member having a first cam member portion and a second cam member portion having a plurality of complementary engagement members; and
    an adjustment lever coupled to the lower jacket assembly, the adjustment lever including a lobe that extends from the adjustment lever and selectively engages the first cam member portion.

2. The steering column assembly of claim 1, wherein the first wall extends from a first mounting arm of the bracket that is coupled to the lower jacket assembly and the second wall extends from a second mounting arm of the bracket that is coupled to the lower jacket assembly.

3. The steering column assembly of claim 2, further comprising:
    a support guide disposed on the lower jacket assembly, the support guide including:
        a base defining a preload tab that engages a surface of the energy absorption strap.

4. The steering column assembly of claim 3, wherein the support guide further includes:
    a first guide member extending from the base having a first lip portion that inhibits the energy absorption strap from lifting away from the base.

5. The steering column assembly of claim 1, further comprising:
    the adjustment lever movable between an unlock position that permits movement of the upper jacket assembly relative to the lower jacket assembly along the steering column axis and a lock position that inhibits movement of the upper jacket assembly relative to the lower jacket assembly along the steering column axis.

6. The steering column assembly of claim 5, wherein in response to the adjustment lever moving from the lock position towards the unlock position, the lobe engages the first cam member portion of the cam member and the cam member pivots about the pin such that the plurality of complementary engagement members are spaced apart from the plurality of engagement members.

7. The steering column assembly of claim 6, wherein the first wall defines a biasing member opening disposed proximate the pin.

8. The steering column assembly of claim 7, further comprising a biasing member disposed about the pin.

9. The steering column assembly of claim 8, wherein the biasing member includes a first biasing member portion that at least partially extends through the biasing member opening and a second biasing member portion that engages the second cam member portion.

10. The steering column assembly of claim 9, wherein the biasing member biases the plurality of complementary engagement members towards engagement with the plurality of engagement members.

11. A steering column assembly, comprising:
an energy absorption strap having a first portion coupled to a lower jacket assembly, a second portion coupled to an upper jacket assembly that is slidably received within the lower jacket assembly, and an intermediate portion having a plurality of engagement members extending between the first portion and the second portion;
a bracket disposed on one of the lower jacket assembly or the upper jacket assembly, the bracket having a first wall defining a first opening and a second wall defining a second opening; and
a cam member disposed between the first wall and the second wall and pivotally connected to the bracket by a pin that extends through the first opening and the second opening, the cam member having a first cam member portion and a second cam member portion having a plurality of complementary engagement members configured to engage the plurality of engagement members, the first wall defines a biasing member opening disposed proximate the first opening.

12. The steering column assembly of claim 11, further comprising a biasing member disposed about the pin.

13. The steering column assembly of claim 12, wherein the biasing member is at least partially disposed between the cam member and the first wall.

14. The steering column assembly of claim 12, wherein the biasing member includes a first biasing member portion that at least partially extends through the biasing member opening and a second biasing member portion that engages the second cam member portion to bias the plurality of complementary engagement members towards engagement with the plurality of engagement members.

15. The steering column assembly of claim 14, further comprising a reinforcement plate having a first reinforcement plate portion disposed proximate the second wall and a second reinforcement plate portion extending from the first reinforcement plate portion towards the first wall, wherein the pin extends through the first reinforcement plate portion.

16. The steering column assembly of claim 11, further comprising:
a support guide disposed on the lower jacket assembly, the support guide including:
a base,
a first guide member extending from the base, the first guide member disposed proximate a first side of the energy absorption strap, and
a second guide member extending from the base, the second guide member disposed proximate a second side of the energy absorption strap.

17. The steering column assembly of claim 16, wherein the first guide member having a first extension portion and a first lip portion extending from the first extension portion, the first lip portion extending at least partially over the energy absorption strap.

18. The steering column assembly of claim 17, wherein the second guide member having a second extension portion and a second lip portion extending from the second extension portion, the second lip portion extending towards the first lip portion and extending over at least another portion of the energy absorption strap.

19. The steering column assembly of claim 18, wherein the second guide member having a position control element extending from the second lip portion, the position control element disposed proximate a side of the cam member.

20. The steering column assembly of claim 19, wherein the position control element includes an engagement side having a first segment and a second segment, wherein the first segment and the second segment extend in opposite directions from an intersection segment at an angle with respect to each other.

* * * * *